(12) United States Patent
Roux et al.

(10) Patent No.: US 9,382,018 B2
(45) Date of Patent: Jul. 5, 2016

(54) METHOD FOR REPAIRING AN AIRCRAFT FUSELAGE

(75) Inventors: Jacques Roux, Colomiers (FR); Gilles Tardu, Toulouse (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 236 days.

(21) Appl. No.: 13/514,863

(22) PCT Filed: Dec. 9, 2010

(86) PCT No.: PCT/FR2010/052651
§ 371 (c)(1),
(2), (4) Date: Aug. 2, 2012

(87) PCT Pub. No.: WO2011/077025
PCT Pub. Date: Jun. 30, 2011

(65) Prior Publication Data
US 2012/0304433 A1  Dec. 6, 2012

(30) Foreign Application Priority Data

Dec. 11, 2009  (FR) ...................................... 09 58891

(51) Int. Cl.
*B23P 6/00* (2006.01)
*B23P 19/04* (2006.01)
(Continued)

(52) U.S. Cl.
CPC ............... *B64F 5/0081* (2013.01); *B29C 73/04* (2013.01); *B29C 73/26* (2013.01); *B29C 73/10* (2013.01); *Y10T 29/49725* (2015.01); *Y10T 29/49726* (2015.01); *Y10T 29/49732* (2015.01);
(Continued)

(58) Field of Classification Search
CPC ....... B64F 5/0081; B29C 73/04; B29C 73/26; B29C 73/10; Y10T 29/49732; Y10T 29/49725; Y10T 29/49726; Y10T 29/49734; Y10T 29/49735; Y10T 29/49737; Y10T 29/49748; Y10T 29/49316
USPC ............... 29/402.05, 402.06, 402.09, 402.11, 29/402.12, 402.14, 402.19, 889.1
See application file for complete search history.

(56) References Cited

U.S. PATENT DOCUMENTS 2,412,972 A * 12/1946 Dean .......................... 29/402.13
2,692,425 A * 10/1954 Martin ....................... 29/402.12
(Continued)

FOREIGN PATENT DOCUMENTS

WO    2007 135318    11/2007

OTHER PUBLICATIONS

Hughes, D., "Canadians Develop Composite Techniques for CF-18 Battle Damage Repair Program," Aviation Week & Space Technology, vol. 132, No. 21, Total 3 Pages, XP 000147983, (May 21, 1990).
(Continued)

*Primary Examiner* — Moshe Wilensky
*Assistant Examiner* — Darrell C Ford
(74) *Attorney, Agent, or Firm* — Oblon, McClelland, Maier & Neustadt, L.L.P.

(57) ABSTRACT

A method for repairing damage to the coating of an aircraft fuselage, the coating being made of fiber-reinforced composite material. This method comprising making a cut-out in the fuselage with a substantially parallelepipedal outline around the damage and drilling a circular hole substantially centered on the intersection of the sides of the outline of the parallelepiped of the cut-out at each of the corners of the outline before the cutting out operation.

19 Claims, 3 Drawing Sheets

(51) Int. Cl.
  *B64F 5/00* (2006.01)
  *B29C 73/04* (2006.01)
  *B29C 73/26* (2006.01)
  *B29C 73/10* (2006.01)

(52) U.S. Cl.
  CPC ...... *Y10T 29/49734* (2015.01); *Y10T 29/49735* (2015.01); *Y10T 29/49737* (2015.01); *Y10T 29/49748* (2015.01)

(56) References Cited

U.S. PATENT DOCUMENTS

| | | | | |
|---|---|---|---|---|
| 4,531,275 | A | * | 7/1985 | Kelly ............................ 29/402.12 |
| 4,858,853 | A | * | 8/1989 | Westerman et al. ............ 244/119 |
| 4,916,880 | A | * | 4/1990 | Westerman, Jr. ................ 52/514 |
| 4,978,404 | A | * | 12/1990 | Westerman, Jr. ................ 156/98 |
| 5,023,987 | A | * | 6/1991 | Wuepper et al. ............ 29/402.11 |
| 5,174,007 | A | * | 12/1992 | Fitz ............................ 29/402.12 |
| 5,281,066 | A | * | 1/1994 | Fitz ............................... 411/378 |
| 5,424,105 | A | * | 6/1995 | Stewart ........................... 428/40.7 |
| 5,868,886 | A | * | 2/1999 | Alston et al. ..................... 156/98 |
| 6,210,108 | B1 | * | 4/2001 | Ebacher ........................... 415/189 |
| 6,681,466 | B2 | * | 1/2004 | David et al. ................. 29/402.01 |
| 6,693,417 | B2 | * | 2/2004 | Wilson ........................ 204/228.7 |
| 8,209,838 | B2 | * | 7/2012 | Lindgren ..................... 29/402.12 |
| 8,636,107 | B2 | * | 1/2014 | Moutier et al. ................ 181/292 |
| 8,800,149 | B2 | * | 8/2014 | Balsa Gonzalez et al. .. 29/897.1 |
| 2004/0070156 | A1 | * | 4/2004 | Smith et al. ..................... 277/651 |
| 2007/0095457 | A1 | * | 5/2007 | Keller et al. ...................... 156/94 |
| 2008/0111024 | A1 | * | 5/2008 | Lee et al. ........................ 244/121 |
| 2008/0302912 | A1 | * | 12/2008 | Yip et al. ........................ 244/119 |
| 2009/0095840 | A1 | * | 4/2009 | Roux et al. ..................... 244/119 |
| 2010/0124659 | A1 | * | 5/2010 | Nelson et al. ............... 428/411.1 |
| 2010/0227117 | A1 | * | 9/2010 | Dan-Jumbo et al. ........... 428/139 |
| 2011/0132523 | A1 | * | 6/2011 | Evens et al. ...................... 156/94 |
| 2011/0139344 | A1 | * | 6/2011 | Watson et al. ................... 156/94 |
| 2011/0217510 | A1 | * | 9/2011 | Harasse et al. ................. 428/137 |
| 2012/0104166 | A1 | * | 5/2012 | Pina Lopez et al. ........... 244/119 |
| 2012/0152438 | A1 | * | 6/2012 | Benthien et al. ................. 156/83 |
| 2013/0024165 | A1 | * | 1/2013 | Tardu et al. ......................... 703/1 |
| 2014/0017445 | A1 | * | 1/2014 | Balsa Gonzalez et al. ... 428/137 |

OTHER PUBLICATIONS

"Composite Repair," Hexcel Composites, Total 13 Pages, XP 002447898, (Apr. 1, 1999).

"Mislocated Corefill or Holes in Honeycomb Panels," Standard Repair, pp. 1-28, XP 000953537, (Dec. 1, 1965).

International Search Report Issued Apr. 19, 2011 in PCT/FR10/52651 Filed Dec. 8, 2010.

* cited by examiner

METHOD FOR REPAIRING AN AIRCRAFT FUSELAGE

BACKGROUND OF THE INVENTION

The invention relates to a method for repairing aircraft primary structures. More specifically, the invention relates to a method for repairing damage to the coating of an aircraft fuselage, which coating is made of fiber-reinforced composite material.

While in operation, aircraft structures are frequently subjected to impacts with birds, vehicles, tools, airport installations, etc. Such impacts create damaged areas within the structure, which have lower mechanical resilience; these areas become prime sites for the start of defects such as cracks, which are likely to propagate.

More specifically, in the case of a fuselage made of fiber-reinforced composite material, the actual damaged area may be significantly larger than the visible impact area.

When an aircraft is subjected to such damage, it must absolutely be repaired so as to recover all the structural strength and avoid the propagation of defects from the damaged area before it can be put back into service.

It must be possible to carry out such repairs within the shortest possible immobilization time for the plane.

A known repair mode involves covering the damaged area with a generally circular liner or patch, whose area is significantly larger than said damaged area, then fastening it to the portion of the structure that remains sound with any appropriate means, such as rivets, bolts, welding or bonding.

This solution has the advantage of being relatively simple to implement. It does, however, have the disadvantage of keeping the damaged zone, which remains under loading and therefore may initiate the propagation of defects, even though the presence of the liner limits the flow of forces to which said area is subjected. Consequently, such repairs can only be very temporary and need to be monitored very closely until a permanent repair can be effected.

In addition, the liner must be shaped to match the shape of the fuselage in the area under consideration. This shape may be complex and non-involute, such that it requires specific shaping of the liner, which being circular in shape must then be cut-out of a larger-size plate, itself made by any sheet metalworking means.

According to another embodiment described, for example, in international patent application WO2007135318 in the name of the applicant, a polygonal cut-out is made around the impact area so as to eliminate the whole of the damaged area. A liner, also polygonal in shape but with a larger surface area, is then fastened to the part that remains sound so as to close the cut-out. This method avoids the initiation of defects in the damaged area, since this has been eliminated. Nevertheless, it is then necessary to ensure that the cutting-out operation itself does not introduce any defects. In the case of patent application WO2007135318, holes centered on the intersection of the sides of the polygon are drilled at each corner of said parallelepiped before cutting-out to facilitate this and to avoid unfortunate "saw-cuts" in the delicate cut-outs at the corners. The method divulged in this patent application aims therefore to avoid the formation of cutting defects which may give rise to cracks at the corners of the polygonal cut-out. Effectively, it is in these areas that the beginnings of cracks are most likely to occur, subsequent to a lack of precision on the part of the operator assigned to cutting-out.

In the case of a fiber-reinforced composite material fuselage, defects such as delamination can be caused during cutting-out, irrespective of the care taken by the operator. The action of the cutting implement, of whatever kind it may be, can easily break the cohesion of plies located at the edge of the cut-out and thus initiate delamination. Where the material that is cut-out is a fiber-reinforced composite material, the risk of introducing defects at the edge of the cut-out depends essentially on the rate of advance of the tool. At a given cutting speed, too high a rate of advance favors the occurrence of delamination, whereas too slow a rate of advance causes thermal degradation of the matrix (burning or melting). This type of cutting-out operation in fiber-reinforced composite materials must therefore be performed at a controlled rate of advance, within a narrow band of admissible speeds. In the case of repair operations, however, the cutting-out advance movement is generally communicated manually to the machine by the actions of the operator who moves it along the path to be cut. Even if a judicious choice of tool geometry can increase the range of favorable cutting-out conditions, it remains difficult or even impossible to prevent delamination of the surface plies from occurring, except where sophisticated methods of automatic advance are implemented, which control the cutting parameters and, in particular, the rate of advance/cutting speed combination along complex trajectories that match the shape of the fuselage.

There is therefore a requirement for a repair method for an aircraft fuselage made of composite material that can be implemented with adequate safety in conditions compatible with the means of airport maintenance workshops and requiring the shortest possible immobilization time for the plane.

BRIEF SUMMARY OF THE INVENTION

To achieve this, the invention proposes a method for repairing a damaged area of the fiber-reinforced composite coating of an aircraft fuselage comprising the following steps:
- realize a polygonal cut-out around the damaged area;
- fit a coating liner with a polygonal outline, an area greater than the cut-out and adjusted to the shape of the fuselage so as to close the cut-out;
- fasten said liner to the fuselage skin that remains sound, with at least two rows of fasteners laid out parallel to the perimeter of the liner;
- a circular hole centered on the intersection of the sides of the polygon having been cut-out in the fuselage at each of the corners of the polygonal outline of the cut-out before the cutting operation.

This method, implemented on a composite material fuselage, has two advantages:
- prior cutting-out of the circular holes is essentially an axial machining operation, which can be carried out by portable means, giving precise control over the cutting conditions;
- the sides of the polygon can be cut out manually, using any appropriate means such as an angle grinder, jig-saw, portable milling machine or router, therefore with less efficient control over the cutting conditions, in particular the advance movement, because, surprisingly, according to this embodiment, these areas are not under loading in operation once the liner has been fitted.

Thus, the cut-outs at the corners are free of defects because of the strict control over the cutting conditions; as for cutting out the sides, even if they were to have defects, these would not be likely to propagate because of the weak stresses to which these areas are subjected.

Advantageously, the diameter of the holes will be between 20 and 40 mm. This diameter is adequate, firstly, to remove the loading from the sides of the cut-out over an adequate width while, secondly, still remaining compatible with conventional drilling means, such as step-drills mounted on an automatic drilling machine (ADM) or portable orbital drilling systems, that allow these holes to be cut out in a single operation, with a single tool and thus avoid the risks linked to adjustment operations.

According to an advantageous embodiment, the liner is not fastened to the fuselage at the corners. Typically, when N rows of fasteners are to be installed, those fasteners located on the outside of an n×n diagonal are not installed. Advantageously, the value of n is between 2 and N.

This embodiment allows for better distribution of the load over all the fasteners and therefore better dissipation of the forces into the structure that remains sound.

According to an embodiment of the method which is the subject of the invention, the liner is made of metal. Thus it will be easier to adjust to the shape of the fuselage using conventional metalworking means. More specifically, if the fuselage is made of carbon-fiber reinforced composite material, the liner will advantageously be made of titanium alloy, both for their galvanic compatibility and for their closely-matched coefficients of thermal expansion.

According to another embodiment, the liner is made of plies of fibers pre-impregnated with organic resin, manually laid-up, shaped directly onto the fuselage on the area of application of the repair.

According to this embodiment, the shape of the liner adjusts itself to the shape of the area it covers during the shaping operation. Advantageously, when the resin is a thermosetting type, curing can be entirely realized on the fuselage.

BRIEF DESCRIPTION OF THE SEVERAL VIEWS OF THE DRAWINGS

The invention will now be described more precisely in the context of preferred non-limiting embodiments shown in FIGS. 1 to 8 in which.

DETAILED DESCRIPTION OF THE INVENTION

All these figures represent an example of realization that implements a parallelepipedal cut-out and liner. The person skilled in the art will adapt these lessons to the more general case of a polygonal cut-out.

Figure 1:
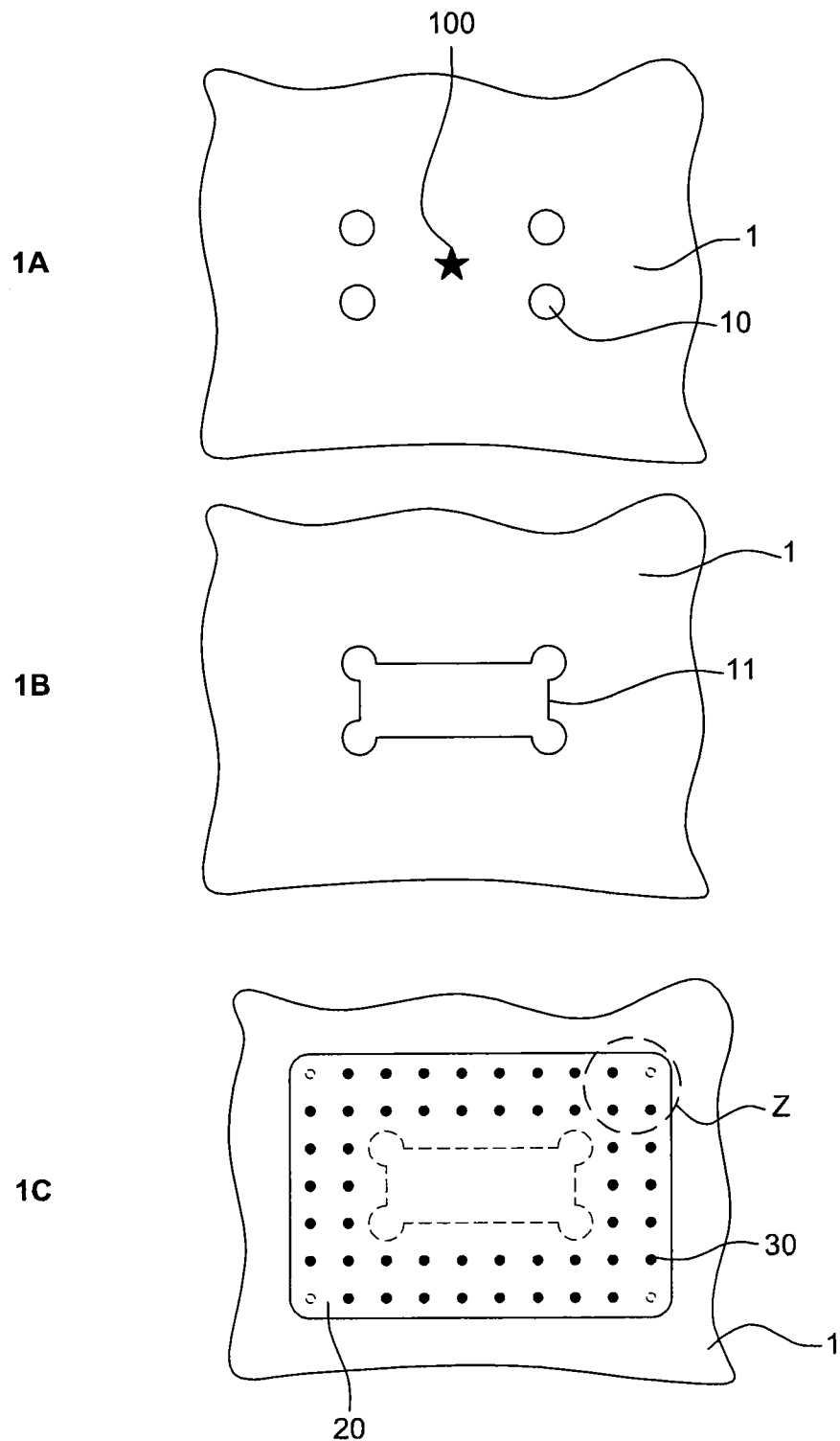
FIG. 1 represents a synopsis of the repair principle which is the subject of the invention, with the drilling of the end holes in FIG. 1A, the cutting out in FIG. 1B and the fitting of the liner in FIG. 1C.

FIG. 1A: the coating of a composite fuselage (1) has been subjected to an impact (100). To perform the repair, the operator starts by drilling four holes (10) using an axial machining device, which holes delimit a rectangular area surrounding the impact. The dimensions of said rectangular area are given by the plane's maintenance manual, depending on the characteristics of the coating and on the characteristics of the impact.

FIG. 1B: from these holes, the operator realizes the cut-out lines (11) to extract the recommended rectangular area from the coating. This cut-out is realized with a radial advance movement tool, to which the advance movement is communicated manually by the operator. As an example, for a fiber reinforced composite coating, this tool can consist of an angle grinder, a jig-saw or a router such as a portable milling machine available under the brand name ONSRUD® manufactured by LMT Tools.

A liner (20) is then applied so as to close the cut-out; it is fastened to the portion of the fuselage that remains sound using N rows of fasteners (30), 2 in this case.

Figure 2:
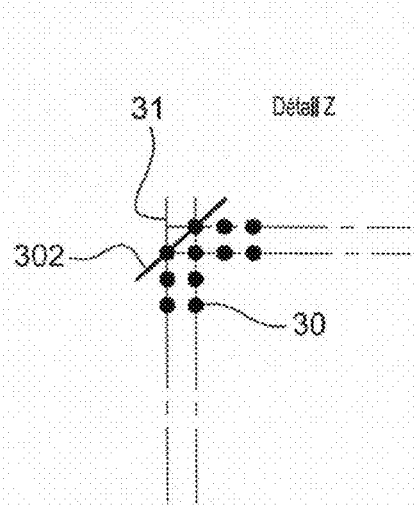
FIG. 2 shows a detail of FIG. 1 C, which highlights the distribution of the fasteners at the corners of the liner.
Figure 3:
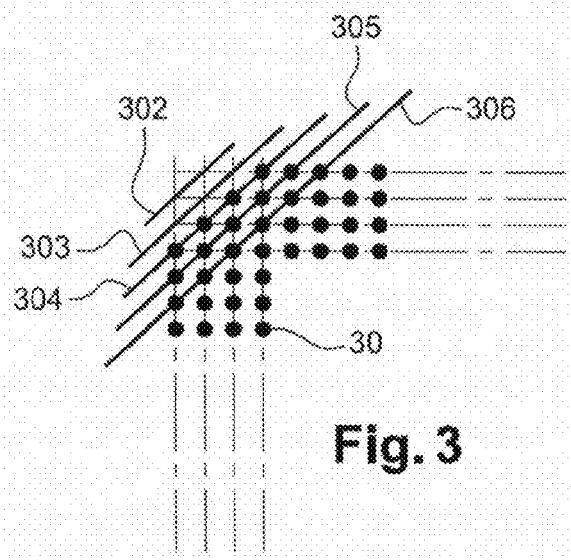
FIG. 3 illustrates the distribution of the fasteners at the corners of the liner in a general case.

FIG. 2: N=2 and so as to distribute the dissipation of forces into the sound portion, the fastener provided for at position (31) located on the outside of the 2×2 diagonal (302) is not fitted at the corner of the liner. FIG. 3: generally, those fasteners located on the outer part of the corner of the liner are not fitted in one or several rows. In the example of FIG. 3, N=4, the fasteners are not fitted at the locations beyond the 4×4 diagonal (304) i.e. 6 fasteners not fitted including the 2×2 diagonal (302) and the 3×3 diagonal (303). The number of fasteners not fitted at the corner depends on the number of rows and on the intensity of the loading, i.e. of the surface area of the damaged area and its location on the fuselage. This configuration is determined by calculation and consigned in the maintenance and repair manual for the most frequent cases.

Figure 4:
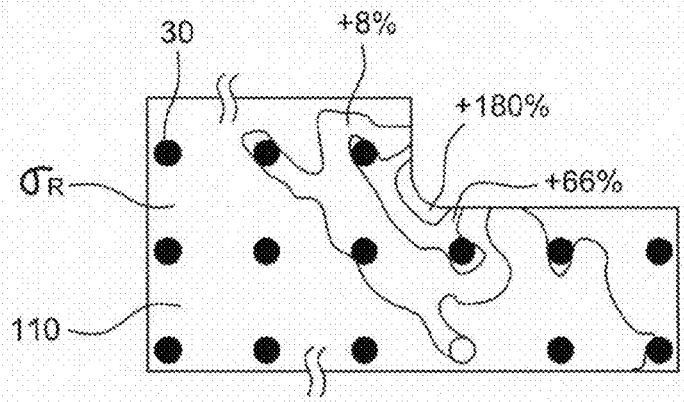
FIG. 4 represents the distribution of the service stress in the fuselage in the vicinity of a repair according to the prior state of the art.
Figure 5:
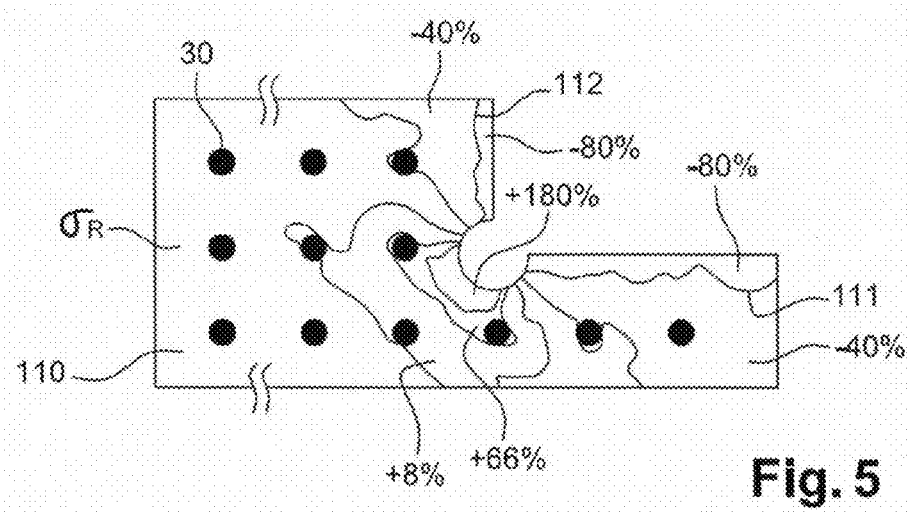
FIG. 5 represents the distribution of the service stress in the fuselage in the vicinity of a repair according to an example of realization of the invention.

FIGS. 4 and 5: comparing the services loading at the edge of the cut-out can be performed using a finite element simulation. Both figures correspond to the same macroscopic loading conditions and give the Von Mises yield criterion in the repaired fuselage in the vicinity of the cut-out. The reference loading, which corresponds to areas distant from the cut-out (110), is the same in both cases. The loading level for the other areas is defined relative to this reference loading.

FIG. 4: by using the cutting out principle of the prior state of the art with skipped connections at the edges of the cut-out, the loading of the straight parts of the cut-out is between 60% and 100% of the reference loading.

FIG. 5: by using the cutting out principle according to the invention, the service loading at the straight edges of the cut-out is reduced by 80%, compared with the reference loading in the immediate vicinity of this edge and still remains 40% lower when moving substantially away from the edge; the isodynamic line (111, 112) delimits this 40% reduction in the reference loading which extend even beyond the first row of fasteners.

Figure 6:
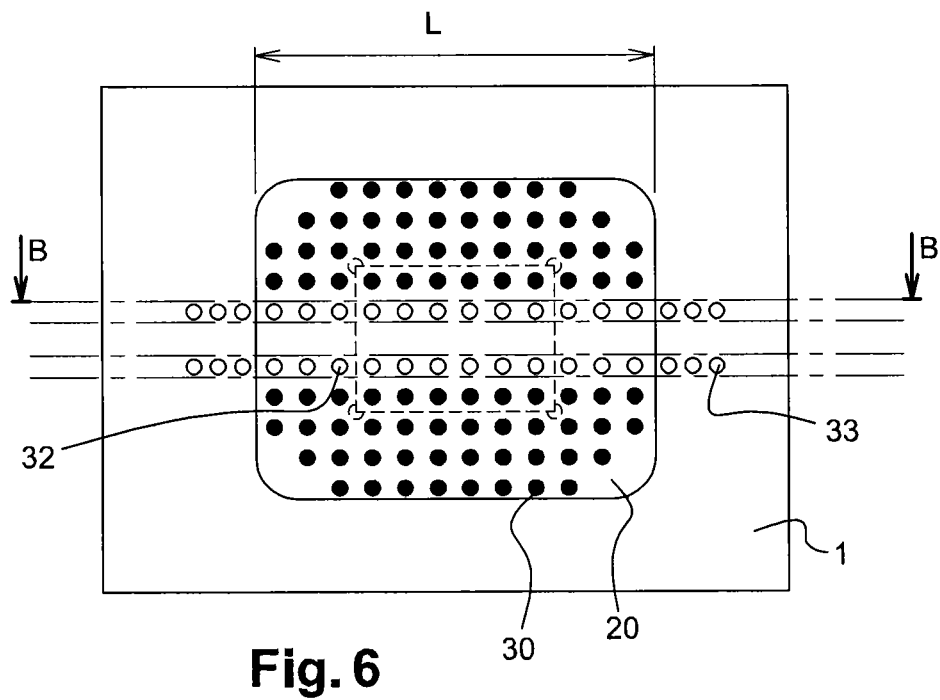
FIG. 6 is an example of repair in a general case that requires cutting out a longitudinal stiffener in front view.

FIG. 6 represents the general case of a fuselage repair, in particular where the area to be cut-out goes through a longitudinal stiffener or stringer (40). In the case of a composite fuselage, such stiffeners are linked to the skin by bonding, cocuring or other techniques of assembly without fasteners. In this case, the stringer is cut out over a width L, greater than the width of the cut-out. The width L is equal to the width of the liner (20) and will therefore vary as a function of the number of rows of fasteners required to fasten it to the sound part of the fuselage and to transmit the flow of forces.

Figure 7:
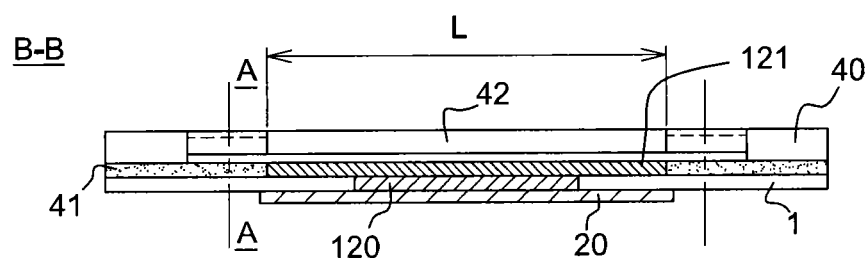
FIG. 7 is a B-B cross-section view along the thickness of the repair shown in FIG. 6.

FIG. 7: a shim (120) whose thickness is equal to the thickness of the skin is placed in the cut-out. An inner liner (121) whose thickness is designed to compensate the thickness of the stringer's flange (41) and whose dimensions are substantially equal to those of the outer liner (20) is placed inside the fuselage. A splice plate (42) is fitted to ensure the mechanical continuity of the stiffener (40).

Fasteners (30) are positioned along an appropriate number of rows, which go through and assemble the outer liner (20), the fuselage skin that remains sound (1) and the inner liner (121). In the cut-out area, said fasteners go through and assemble the outer liner, the shim (120) and the inner liner.

Where the stringer (40) goes through in the vicinity of the cut-out, fasteners (32) go through and assemble the outer liner, the shim (120), the inner liner (121) and the flange of the stringer splice plate (42).

Outside the cut-out area, the same type of fastener (32) assembles and goes through the outer liner, the fuselage skin, the inner liner and the base of the stringer splice plate.

Figure 8:
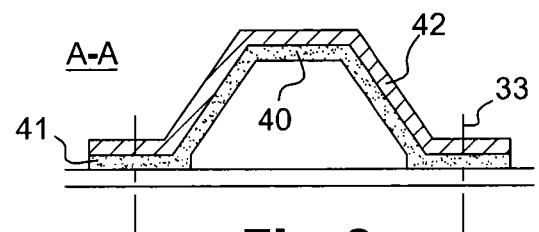
FIG. 8 is a transversal A-A cross-section view of this same view in the immediate vicinity of the repair.

Lastly, FIG. 8: beyond the outer liner, a third type of fastener (33) assembles and goes through the outer skin, the flange (41) of the original stringer and the flange of the stringer splice plate.

Advantageously, the stringer splice plate (41) is made of metal, preferably titanium alloy approximately 1 mm thick.

The fasteners can be of rivet type but are preferably of the bolted type, such as Hi-Lite® fasteners, supplied by the company with the same name, which provide an assembly that is easily mounted and removed to perform a final repair.

The above description clearly illustrates that through its various features and their advantages the present invention realizes the objectives it set itself. In particular, since the section of the cut-out is designed to significantly reduce the stresses at the edges of the cut-out, the composite aircraft fuselage repair method according to the invention can be implemented with adequate safety in conditions compatible with the means of maintenance workshops of airports and requiring the shortest possible immobilization time for the plane.

The invention claimed is:

1. A repair method for a damaged area in the coating of a fiber-reinforced composite fuselage, comprising:
    drilling a circular hole, substantially centered on an intersection of sides of a polygonal outline of a cut-out in the fuselage around the damaged area, at corners of said outline;
    cutting lines of the cut-out that extend from the corners;
    fitting a coating liner with a polygonal outline, the liner having an area greater than an area of the cut-out and adjusting a shape of the fuselage so as to close the cut-out;
    fastening said liner to a fuselage skin outside of the damaged area with a plurality of fasteners, each respective edge of a perimeter of the liner having adjacent thereto N rows of plural fasteners, laid out parallel to the respective edge,
    wherein N is a positive integer greater than or equal to 2, and
    wherein at each respective corner of the liner, a diagonal of the fasteners is fitted,
    wherein a first end of the diagonal being a terminal fastener of an outermost row of plural fasteners on a first edge of the coating liner and being N fasteners away from a second edge of the coating liner, and a second end of the diagonal being is a second terminal fastener of an outermost row of plural fasteners on the second edge of the coating liner and being N fasteners away from the first edge of the coating liner, and
    wherein fasteners are not fitted outside the diagonal in a direction toward the respective corner.

2. The method according to claim 1, wherein the diameter of the circular hole previously cut out is between 20 and 40 mm.

3. The method according to claim 1, wherein each circular hole is cut-out in a single operation and with a single tool.

4. The method according to claim 1, wherein the liner is made of a metal alloy.

5. The method according to claim 1, wherein the liner is made of a stack of pre-impregnated plies shaped when hot on the fuselage.

6. An aircraft comprising a repair realized according to claim 1.

7. The method according to claim 1, wherein the cut-out is centered on a longitudinal stringer of the fuselage.

8. The method according to claim 1, wherein the cut-out overlaps an elongate stiffener comprised in the fuselage, the stiffener having transverse flange portions connected by a middle stiffening portion, the method comprising:
    cutting the stiffener in a transverse direction so as to remove a longitudinal portion of the stiffener between two cut ends of the stiffener;
    providing in the cut-out a shim;
    providing inside the fuselage an inner liner that extends longitudinally between the cut flange portions of the stiffener; and
    fastening together the liner, the shim, and the inner liner inside of the cut-out area with a plurality of the fasteners.

9. The method according to claim 8, wherein the shim has a thickness equal to a thickness of the fuselage skin surrounding the cut-out.

10. The method according to claim 8, wherein the inner liner has a thickness substantially equal in thickness to the flange portions of the stiffener.

11. The method according to claim 8, wherein the fasteners inside the cut-out area are aligned with the N rows of fasteners.

12. The method according to claim 8, wherein the longitudinal portion is wider than the cut-out.

13. The method according to claim 8, further comprising:
    providing a splice plate having transverse flange portions connected by a middle stiffening portion, the splice plate having a thickness and an elongate shape that extends between and overlaps the two cut ends of the stiffener such that the flange portions of the splice plate overlap the flange portions of the two cut ends of the stiffener to provide mechanical continuity across the fuselage between the two cut ends where the longitudinal portion of the stiffener is removed,
    wherein the splice plate abuts the inner liner.

14. The method according to claim 13, further comprising:
    fastening together the liner, the fuselage skin, the inner liner, and the splice plate outside of the cut-out area with a plurality of second fasteners laid out longitudinally in the flange portions of the splice plate.

15. The method according to claim 13, further comprising:
    fastening together the liner, the shim, the inner liner, and the splice plate inside of the cut-out area with a plurality of second fasteners laid out longitudinally in the flange portions of the splice plate.

16. The method according to claim 13, further comprising:
    fastening together the fuselage skin, the stiffener, and the splice plate in areas where the splice plate overlaps the stiffener with a plurality of third fasteners laid out longitudinally in the flange portions of the splice plate.

17. The method according to claim 8, wherein the liner and the longitudinal portion of the stiffener removed from the fuselage are equal in width.

18. The method according to claim 8, wherein the stiffener is linked to the fuselage skin by bonding.

19. The method according to claim 8, wherein the stiffener is linked to the fuselage skin by cocuring.

* * * * *